(12) United States Patent
Freund et al.

(10) Patent No.: US 9,658,739 B1
(45) Date of Patent: May 23, 2017

(54) OPTIMIZING PRESENTATION OF INTERACTIVE GRAPHICAL ELEMENTS BASED ON CONTEXTUAL RELEVANCE

(71) Applicant: Google Inc., Mountain View, CA (US)

(72) Inventors: Martin Brandt Freund, Mountain View, CA (US); Yuanying Xie, Mountain View, CA (US)

(73) Assignee: Google Inc., Mountain View, CA (US)

( * ) Notice: Subject to any disclaimer, the term of this patent is extended or adjusted under 35 U.S.C. 154(b) by 330 days.

(21) Appl. No.: 14/060,577

(22) Filed: Oct. 22, 2013

(51) Int. Cl.
*G06F 3/048* (2013.01)
*G06F 3/0481* (2013.01)

(52) U.S. Cl.
CPC .................. *G06F 3/04817* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,633,315 | B1 * | 10/2003 | Sobeski | G06F 9/4443 715/762 |
| 8,464,180 | B1 * | 6/2013 | Kirkham | H04M 1/72586 715/765 |
| 9,244,583 | B2 * | 1/2016 | Lovitt | G06F 9/4443 |
| 2008/0005067 | A1 * | 1/2008 | Dumais | G06F 17/30528 |
| 2008/0005068 | A1 * | 1/2008 | Dumais | G06F 17/30528 |
| 2009/0150807 | A1 * | 6/2009 | George | G06F 3/0482 715/763 |
| 2009/0172562 | A1 * | 7/2009 | Lai | G06F 3/04817 715/745 |
| 2011/0072492 | A1 * | 3/2011 | Mohler | G06F 3/04817 726/3 |
| 2013/0007662 | A1 * | 1/2013 | Bank | G06F 9/4443 715/811 |
| 2013/0311946 | A1 * | 11/2013 | Kwon | G06F 3/04817 715/811 |
| 2014/0075328 | A1 * | 3/2014 | Hansen | G06F 3/011 715/747 |
| 2014/0075351 | A1 * | 3/2014 | Hansen | H04M 1/72547 715/765 |
| 2014/0075352 | A1 * | 3/2014 | Hansen | G06F 9/4451 715/765 |
| 2014/0075385 | A1 * | 3/2014 | Wan | G06Q 10/1093 715/812 |

(Continued)

*Primary Examiner* — Hien Duong
(74) *Attorney, Agent, or Firm* — Lowenstein Sandler LLP

(57) ABSTRACT

A method includes identifying a plurality of interactive graphical elements that are associated with a user account. Each interactive graphical element identifies a type of an application and provides access to the respective application. A history usage database is accessed for the user account. The history usage database includes access patterns for the plurality of interactive graphical elements at particular calendar times. A weighting value is assigned to one or more of the access patterns of the interactive graphical elements. A request to display the interactive graphical elements for the user account is received and in response, an ordering of the interactive graphical elements is produced. The ordering of the select ones of the interactive graphical elements is influenced, at least in part, based on the weighting value of the one or more access patterns and a current calendar time when the request is received.

19 Claims, 12 Drawing Sheets

(56) References Cited

U.S. PATENT DOCUMENTS

| | | | |
|---|---|---|---|
| 2014/0089824 A1* | 3/2014 | George | G06F 8/38 715/762 |
| 2014/0108978 A1* | 4/2014 | Yu | G06F 3/04817 715/765 |

* cited by examiner

OPTIMIZING PRESENTATION OF INTERACTIVE GRAPHICAL ELEMENTS BASED ON CONTEXTUAL RELEVANCE

BACKGROUND

As the Internet has become mainstream, content providers are streamlining their services by providing users with various options to access different websites, applications and/or services from within a single website or application. The various options are typically provided in a toolbar. The applications provided in the toolbar are static in nature and do not adapt to, for example, the context the user is in or the users preferences and behavioral patterns. As the users access the various applications, websites and/or service options using the toolbar, some of the static options provided to the users appear redundant or become less relevant. This is especially true when a user is in a website or is accessing a service or application and the same application/service or the website is also provided in the toolbar or the toolbar provides an application or website or service option in which the user has not shown any interest.

It would be desirable to have a options presentation tool for presenting the applications, services and/or websites in an optimal manner so that the options are less redundant and more relevant to the users.

It is in this context various implementations arise.

SUMMARY

The present disclosure relates to methods, systems and computer programs for optimizing ordering and presentation of services, applications, websites and other interactive graphical elements (collectively termed "applications") associated with a user account so that the applications presented are relevant to the context of the user account. The ordering and presentation takes into consideration the access patterns for the interactive graphical elements at particular calendar times and assigns weighting values to one or more of the access patterns. When a request for rendering the interactive graphical elements is received, the interactive graphical elements are identified and ordered based, at least in part, on the weighting value associated with the previous access patterns and a current calendar time. The ordering takes into consideration various usage characteristics associated with the graphical elements defined in the previous access patterns at different times and the context of the request, to identify and organize the interactive graphical elements for presentation. The ordered graphical elements are appropriate for the user account at the current calendar time.

It should be appreciated that the present disclosure can be implemented in numerous ways, e.g., a process, an apparatus, a system, or a method on a computer readable medium. Several embodiments of the present disclosure are described below.

In some embodiments, a method is disclosed. The method includes the following method operations: identifying a plurality of interactive graphical elements that are associated with a user account, wherein each interactive graphical element identifies a type of an application and provides access to the application; accessing a history usage database for the user account, wherein the history usage database includes access patterns for the user account for the plurality of interactive graphical elements at particular calendar times; assigning a weighting value to one or more of the access patterns of the interactive graphical elements; and receiving a request to display the interactive graphical elements for the user account, wherein the request acts to produce an ordering of the interactive graphical elements. The ordering is at least partially influenced by the weighting value of the one or more access patterns and a current calendar time at which the request is received.

In some embodiments, the interactive graphical elements are rendered as application icons.

In some embodiments, the access pattern defines a selection sequence followed within the user account for the interactive graphical elements at a particular calendar time.

In some embodiments, the history usage database is a repository that maintains access patterns for a plurality of user accounts.

In some embodiments, the history usage database is a repository that maintains the access patterns for the user account, each access pattern is associated with a particular calendar time.

In some embodiments, each access pattern for the user is correlated to a computing configuration type of a device of the user on which the access pattern was produced.

In some embodiments, the computing configuration type includes one or more of type of computing device platform, type of operating system, type of browser, language setting type, or any combinations thereof.

In some embodiments, the access pattern identifies usage correlations between two or more interactive graphical elements.

In some embodiments, increased repeated access sub-patterns between particular interactive graphical elements within the access patterns produces an increase to the weighting value for the access patterns that include the access sub-patterns.

In some embodiments, the ordering uses a prediction process that combines past interactive data provided in the access patterns within the history usage database and applies the weighting values associated with the access patterns to increase or decrease significance for the interactive graphical elements provided in response to the request.

In some embodiments, the ordering defines a location on a screen of a device from which the request originated, for rendering the ordered interactive graphical elements.

In some embodiments, the ordering includes organizing the interactive graphical elements under user specified or context specific category types.

In some embodiments, the ordering includes user customization, wherein the user customization includes defining an ordering position for a select graphical element, when present, for the user account.

In some embodiments, feedback is received on usage of the interactive graphical elements provided in the ordering and the feedback is used to reinforce or refine the weighting values assigned to the respective access patterns, the reinforcement or refinement of the weighting values affecting the ordering of the interactive graphical elements provided for the user account.

In some embodiments, the feedback acts to identify one or more new interactive graphical elements for inclusion in the ordering provided for the user account.

In some embodiments, the one or more new interactive graphical elements are identified for a particular category, wherein the ordering is adjusted to include the new interactive graphical elements within the particular category for the user account.

In some embodiments, wherein the one or more of the new interactive graphical elements are identified to replace the one or more of the interactive graphical elements within the ordering for the user account.

In some embodiments, a method is disclosed. The method includes the following method operations: providing access to a user account in response to a request, the user account associated with context; identifying a plurality of interactive graphical elements for a current calendar time, based on the context of the user account, wherein each of the interactive graphical elements identifies a type of an application and provides a link to access the application; identifying access patterns for the identified plurality of interactive graphical elements associated with the user account, from a history usage database, wherein the history usage database maintains access patterns for the plurality of interactive graphical elements at particular calendar times; assigning a weighting value to the one or more of the access patterns of the interactive graphical elements; and presenting an ordering of the plurality of interactive graphical elements identified for the user account for a current calendar time, in response to the request. The ordering is influenced by the weighting value of the one or more access patterns, the current calendar time and any user customization defined for the one or more of the interactive graphical elements.

In some embodiments, a non-transitory computer readable medium with programming instructions for performing a method, is disclosed. The computer readable medium includes program instructions for identifying a plurality of interactive graphical elements that are associated with a user account, wherein each interactive graphical element identifies a type of an application and provides access to the respective application; program instructions for accessing a history usage database for the user account, the history usage database including access patterns for the plurality of interactive graphical elements at particular calendar times; program instructions for assigning a weighting value to one or more of the access patterns of the interactive graphical elements; and program instructions for receiving a request to display the interactive graphical elements for the user account, the request acting to produce an ordering of the interactive graphical elements, the ordering at least in part being influenced based on the weighting value of the one or more access patterns and a current calendar time at which the request is received.

These embodiments may provide one or more of the following advantages: users are provided with applications that are relevant for the user for a given calendar time by eliminating redundancy in the applications presented and by providing only those graphical elements that are contextually useful, relevant and appropriate for the user. An optimization tool determines past interactive data provided in the access patterns for the user account and combines that with weighting values defined for the one or more of the access patterns at particular calendar times to identify and present specific ones of the interactive graphical elements for the given calendar time. Once presented, usage feedback is gathered for the presented graphical elements and used to either reinforce or refine the weighing values assigned to the respective access patterns, the reinforcement or refinement of the weighting values influencing the ordering of the interactive graphical elements provided for the user account. The ordering also considers any user customization for the one or more interactive graphical elements so as to provide a more personalized ordering of the graphical elements.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIG. 3D-1 illustrates an alternate implementation to the implementation illustrated in FIG. 3D.

DETAILED DESCRIPTION

Figure 1A:
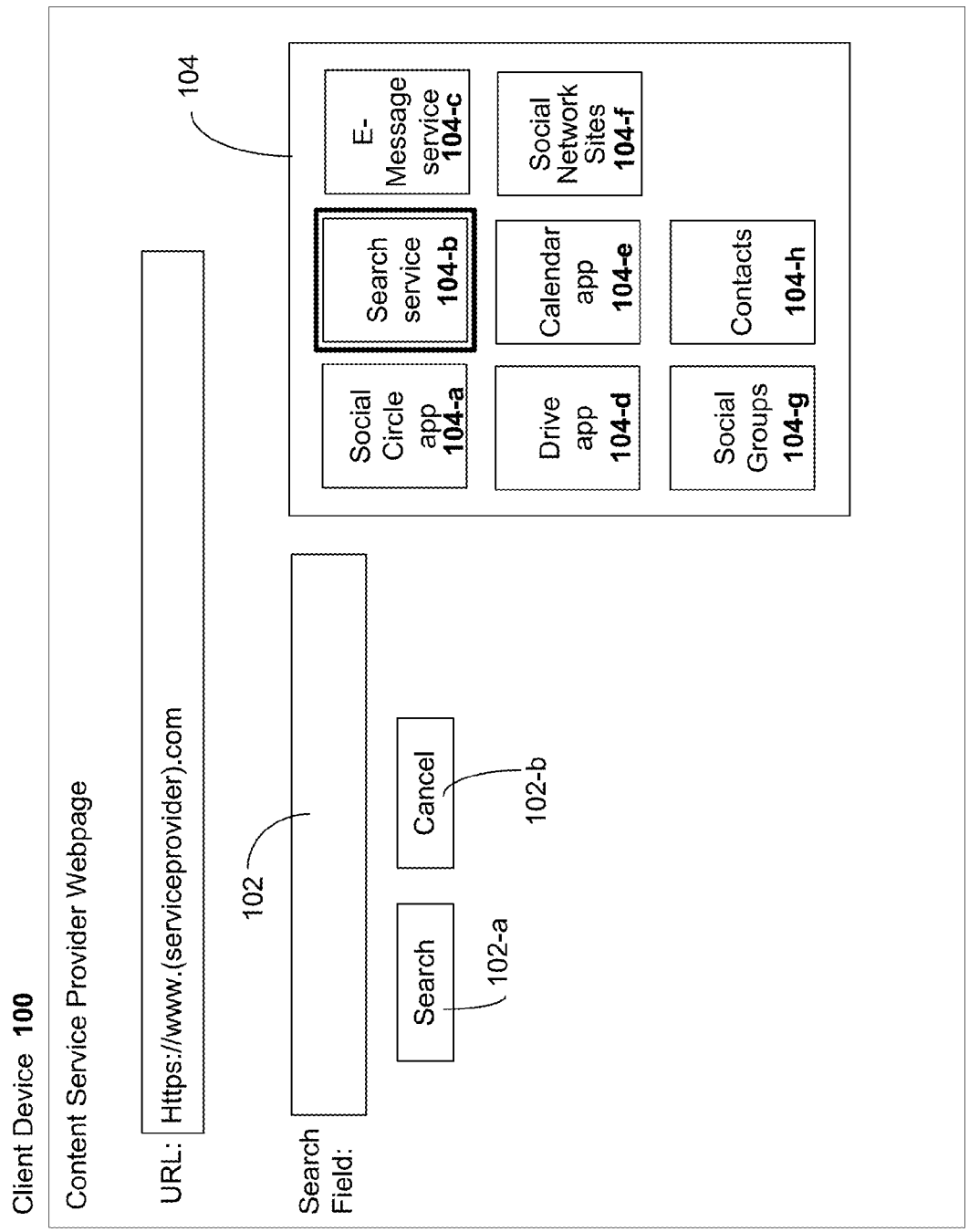
FIGS. 1a-1c illustrate a user interface rendering the interactive graphical elements that were provided using conventional presentation tool.

The following implementations describe methods, computer programs, and systems for presenting an optimized list of contextually relevant interactive graphical elements for a user account that are ordered based on prior usage pattern detected in the user account. A plurality of interactive graphical elements are identified for a user account. One or more of the plurality of graphical elements are selected for presentation at the user account, in response to a request for rendering the interactive graphical elements. The interactive graphical elements are selected based on the context of the user account at a calendar time when the request is received and based on the access patterns established for the interactive graphical elements within the user account at various calendar times. The selected ones of the interactive graphical elements are organized in accordance to the weighting values assigned to one or more of the access patterns associated with the selected graphical elements and the calendar time of the request.

A context of the user account is determined at a calendar time the request was received and the graphical elements are selected in accordance to the context. The context may be determined from the graphical element selected when accessing the user account at the calendar time. The access patterns define selection sequence followed for the interactive graphical elements within the user account and the weighting values are accorded to the access patterns based on the selection sequence. The selected graphical elements are rated and ranked in accordance to the weighting values assigned to the access patterns and the context of the user account. In addition to the selection sequence, the access patterns identify one or more additional usage characteristics. Some examples of usage characteristics defined by the access patterns include frequency of usage of each graphical element, duration of engagement at each graphical element, geo location of a device from where the request was generated, contextual relation of the graphical elements to the geo locations, contextual usage of the graphical elements, etc. The contextual usage identifies usage correlation between the interactive graphical elements. For example, a particular graphical element may be used only in connection with specific ones of the graphical elements and may not be used with other graphical elements. The selection and organization of the graphical elements for the user account may take into consideration the usage correlation. The organization of the graphical elements may be adjusted to allow user customization to provide a personalized ordering of graphical elements. In some implementations, in addition to the specific ones of the graphical elements for the current calendar time, one or more of other graphical elements may also be included for presentation in the toolbar. The other graphical elements may be organized within the toolbar in an order that is reflective of the graphical elements' relevance for the user account. For example, the other graphical elements may be organized after the contextually relevant graphical elements in the toolbar.

The various implementations describe an organization and presentation tool for selecting, ordering and presenting contextually relevant graphical elements for a user account, by intelligently predicting user's behavior pattern for that calendar time based on past behavioral patterns of a user. In some implementations, the user is provided with the option to consent or dissent any processing of user usage data for providing a customized toolbar for the user account. The selection and presentation also address the redundancy issue associated with the conventional rendering tools by including only those graphical elements that are contextually and temporally relevant for the user account and excluding the graphical elements that are contextually and/or temporally irrelevant to the user during the current calendar time. The graphical elements may be provided as application icons. It should be noted that the graphical elements that were excluded in the presentation for the user account for a current calendar time may be contextually and/or temporally relevant for the user account at other calendar times. Such changes in relevancy are recognized for different calendar times and the organization and presentation of the relevant graphical elements for the user account are adjusted to accommodate the change in the relevancy. In some implementations, the selected graphical elements are presented in a toolbar of the user account.

Figure 1B:
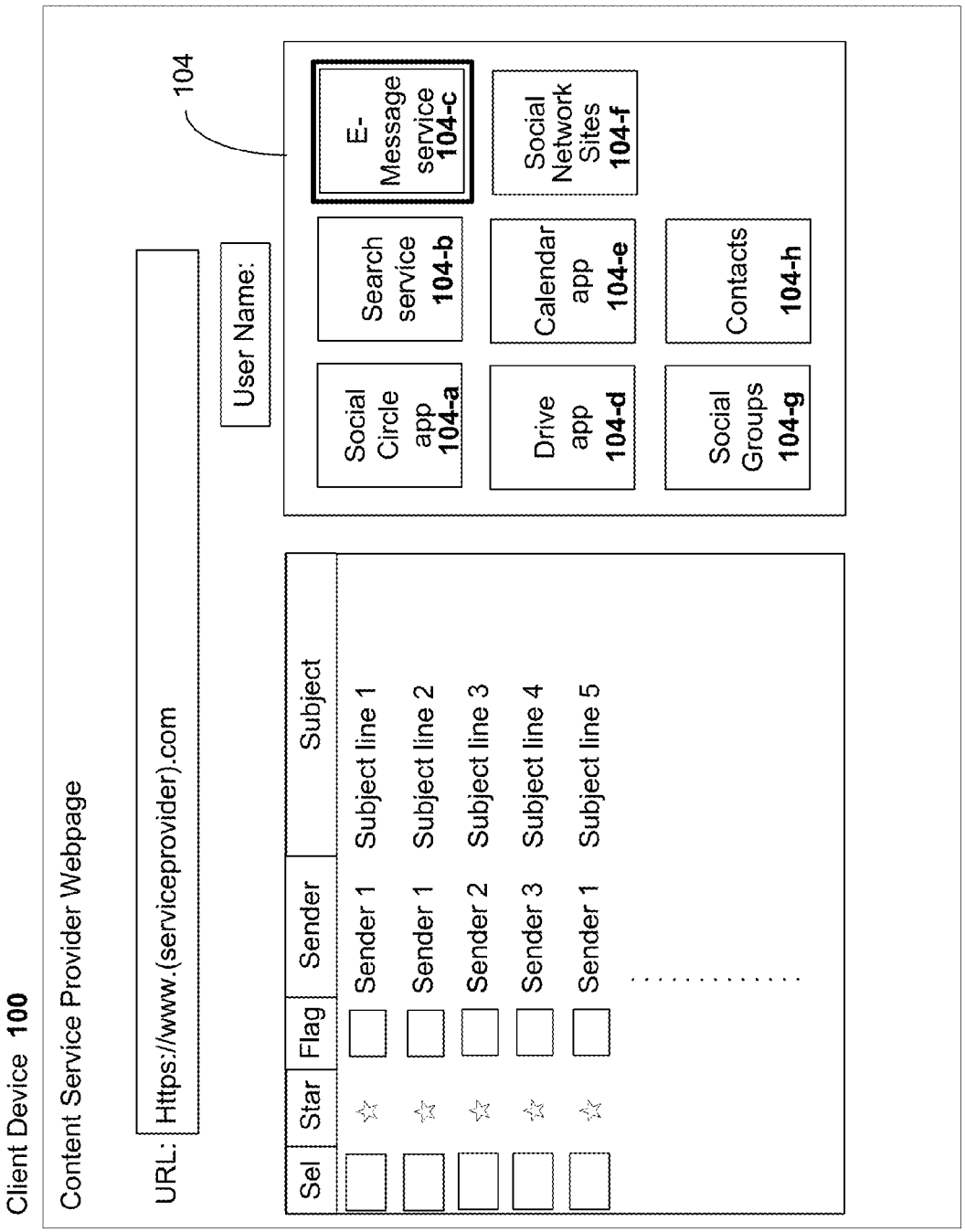
Figure 1C:
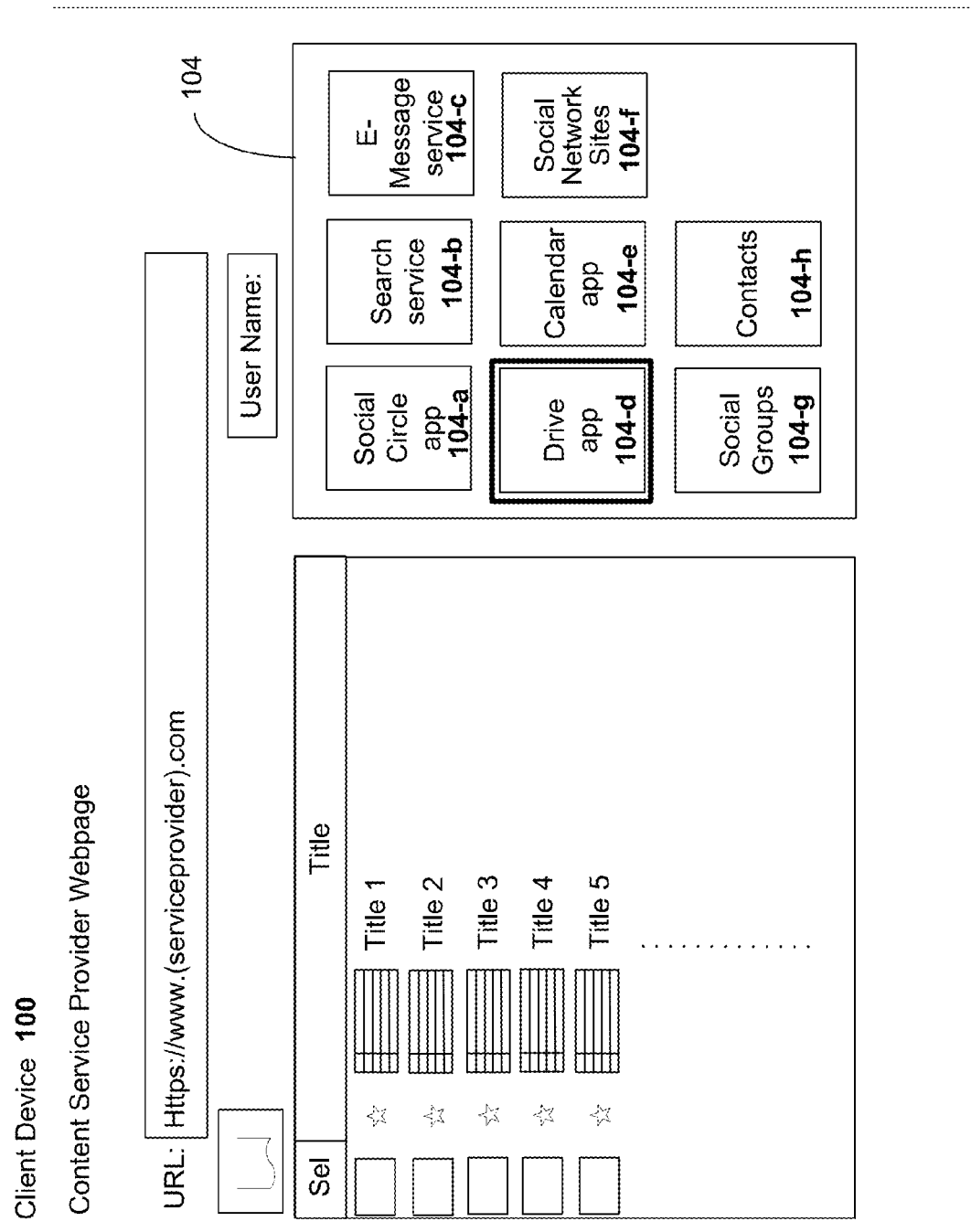

FIGS. 1A-1C illustrate sample user interface of a client device rendering the graphical elements for a user account using conventional tool. The rendered graphical elements identify the drawback or disadvantage of the convention tool. Primarily, the graphical elements provided for the user account are in a static order and include elements that may or may not be contextually or temporally relevant for the user account at the time of rendering. For example, FIG. 1A illustrates the user interface on a client device for the user account at a current calendar time wherein a search service option has been selected. The search option includes a search field 102 and one or more options 102-a, 102-b, for initiating or canceling a search. Alongside the search option, a tool bar 104 is also presented. The toolbar presents a plurality of graphical elements that are available for the user account, in the form of application icons. The tool bar includes the search option, 104-b, along with the other graphical elements. The search option, 104-b, in the tool bar is redundant as the user is already accessing the search option.

FIG. 1B illustrates a similar redundancy in the graphical element options presented in the toolbar 104 by the conventional tool. As shown, the user is accessing an electronic message account at a given calendar time and the "Message" option 104-c is presented in the toolbar 104. It is highly unlikely that the user will find the message option 104-c relevant especially as the user is already using the Message option.

Similarly, FIG. 1C illustrates a user accessing "Drive" option 104-d in the user interface at a specific calendar time and the toolbar 104 includes the "Drive" option, making this option temporally and contextually redundant for the specific calendar time. Additionally, the presentation of the graphical elements in the toolbar 104 is static and includes all the options that are available to the user account arranged in a specific order. The conventional tool does not look into the context of the user account or relevance of the graphical elements at the time a request is received for presentation.

To overcome such redundancy and irrelevancy in the presentation of the graphical elements, various implementations of an optimization tool will now be discussed with reference to FIG. 2.

Figure 2:
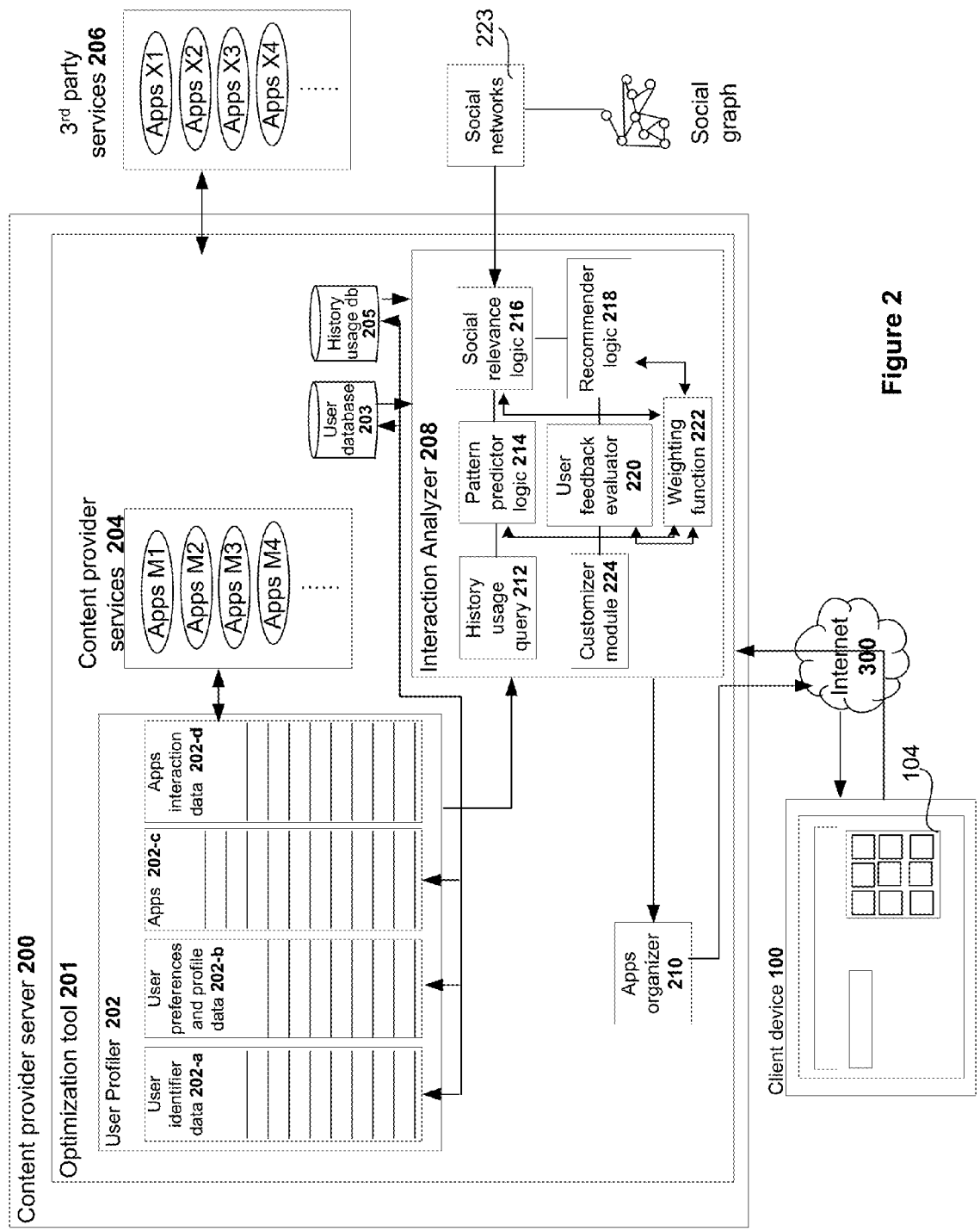
FIG. 2 illustrates an optimization tool used to optimize presentation of graphical elements, in accordance with some implementations.

FIG. 2 illustrates various components of an optimization tool and various modules within a content provider server that are used in presenting an optimized list of contextually and temporally relevant graphical elements for a user account for different calendar times. The graphical elements are selected and organized by determining behavioral patterns of a user associated with the user account and/or of other users over different calendar times so as to make the organized list of graphical elements selected for the user account contextually relevant at a current calendar time. A content provider server (or simply a 'server') 200 provides the infrastructure for generating the optimized list of relevant graphical elements for the user account. An optimization tool on a server includes programming logic to interact with the client device and to receive a request for graphical elements. In response to the request, the optimization tool interacts with one or more modules of the server 200 to obtain access patterns of a user associated with the user account. In some implementations, the optimization tool may also obtain access patterns of one or more of the other users. The other users may be socially or demographically related to the user of the user account. The access patterns are analyzed to determine behavioral patterns of the user and, optionally, of the other users to identify one or more graphical elements for a current calendar time. The identified graphical elements are organized for presenting at the user account, in response to the request.

The client device 100 may be any type of computing device with different computing configuration types. In some implementations, the client device may include a laptop computing device, a tablet, a mobile computing device, etc. The different computing configuration types may include a type of computing device platform, type of operating system, type of browser used, language setting type, etc. The list of computing device and computing configuration types are exemplary and should not be considered exhaustive or limiting. The client device includes a display device with a user interface. The client device is configured to interact with a server 200 over a network (for e.g., the Internet) 300, to transmit a request for interactive graphical elements for a user account for a particular calendar time and to render a list of graphical elements for the user account returned by the server, on the display device.

The server 200 includes an optimization tool 201 that is used to receive the request for interactive graphical elements, process the request, identify and order the interactive graphical elements for the user account and to return the ordered list of graphical elements to the client device, in response to the request. The optimization tool 201 includes at least a user profile module 202, a content provider service module 204, a third party service module 206, an interaction analyzer module 208 and an application organizer module 210 to receive, process the request, and return a list of graphical elements. The interaction analyzer module 208, in turn, includes a plurality of logic modules to analyze user interactions including selection sequence at the user account of a user as well as user accounts of other users and to determine user preferences and access patterns associated with the users at different calendar times. Some of the logic modules within the interaction analyzer module 208 include history usage query logic 212, pattern predictor logic 214, social relevance logic 216, recommender logic 218, user feedback evaluator logic 220, a weighting function logic 222 and a customizer logic 224. Details of the functions of the logic modules within the interaction analyzer module 208 will be described further below.

The user profile module 202 of the optimization tool 201 maintains and provides user profile information for the user account. Information within the user profile module 202 may include user identification information 202-a, user preferences 202-b, applications, services, websites and other interactive graphical elements 202-c and at least a portion of interaction data related to graphical elements 202-d for the user account. The applications, services, websites, and other graphical elements are commonly represented as "Applications" in the various implementations. The user identification information 202-a is obtained and maintained for user accounts based on input provided by the users. The user identification information, as the name suggests, includes information related to identity of a user and includes one or more static and dynamic user attributes, for e.g., name, gender, date of birth, address, geo location, etc. The geo location, in some implementation, may be obtained from the client device using a location processor, for e.g., global positioning system tool available within the client device, and represents the dynamic attribute of the user while the game, gender, date of birth, address of the user represents the static attributes of the user associated with the user account. In some implementations, the location processor within the client device may be activated through a user's explicit actions indicating the user's desire to have the client device tracked. The user identifier information may be maintained in a user database 203 and updated periodically as and when changes to the identifier information is detected for the user account.

In some implementations, user preferences data 202-b is obtained through users input at the user accounts. In some other implementations, the user preferences data 202-b may be obtained from users input at the user accounts and fine-tuned based on the user interactions registered over time at the user accounts. The user preferences data 202-b may be maintained in the user database 203 along with the user identification data for each of the user accounts.

The interactive graphical elements 202-c for the user account include applications, services, links to websites, and other interactive graphical elements provided by the content service provider and graphical elements provided by third party service providers. The graphical elements are obtained by interacting with content provider service module 204 and the third party service module 206. The third party service module 206 acts as an interface for obtaining the third party owned interactive graphical elements from the third party service providers.

The graphical element interaction data module 202-d within the user profile includes at least part of the interaction data captured for the user account. In some implementations, the interaction data within the interaction data module 202-d may include interaction data for an extended period encompassing the current calendar time. The interaction data and graphical elements related data are maintained in a history usage database 205.

The interaction analyzer 208 receives a request from the client device, over the network 300, for rendering interactive graphical elements and, in response, retrieves user data and the access patterns for the graphical elements to identify a set of graphical elements for the user account that need to be returned to the client device for presentation. The request from the client device may be in response to a user accessing the user account. The history usage query logic 212 within the interaction analyzer 208 queries the user database 203 to obtain the user profile information including user identification information, user's preferences, and the graphical elements that are available for the user account. In some implementations, the history usage query logic 212, in addition to obtaining the user preferences of the user that initiated the request, may also obtain user preferences of other users from other user accounts related to various graphical elements. The user preferences and graphical elements information obtained by the history usage query logic 212 is provided to the pattern predictor logic 214.

The pattern predictor logic analyzes the information provided by the history usage query logic 212 to determine the user(s) access pattern for different time periods based on user interaction at the user account and determine the access pattern of the different graphical elements for the current calendar time for the user account. The access pattern identifies the selection sequence followed by the user for the graphical elements at a calendar time when the access pattern was generated. For example, user interactions at the user account may identify that every weekday the user accessed electronic message application, electronic calendar application, drive service at 8:00 a.m., electronic message application, sites application, drive service at noon, and calendar application, search service and social network application at 5:00 p.m. In the above example, three different access patterns are generated for the user for each calendar time. Thus, the access pattern generated for a weekday at 8:00 a.m. includes message application, calendar application and drive service; the access pattern generated for a weekday at noon includes message application, sites application and drive service; and the access pattern generated for a weekday at 5:00 p.m. includes calendar application, search service, and social network application. Further, on first of every month (irrespective of the day of the week), the history usage query logic 212 determines that the user accessed bank website, and mortgage calculator application. On weekends, the user is detected to have accessed the social network application and electronic message application at 10:00 a.m., and search service intermittently during the weekend. As a result, the access pattern for the user is updated to include these application selections as well. Using the information from the user's access patterns at different calendar times, the pattern predictor logic 214 may intelligently predict the access pattern for the user account for a current calendar time.

In the above example, the pattern predictor logic 214 may determine the calendar day and time the request for the graphical elements was received from the client device and identify the graphical elements for providing to the user. Thus, for a request received on a weekday at 8:00 a.m., the predictor logic may determine the previous access patterns for the user account for the calendar time (for e.g., weekday at 8:00 a.m. or Monday, Tuesday, . . . at 8:00 a.m., etc.) to identify the graphical elements, electronic message application, electronic calendar application, drive service, as the most relevant graphical elements for the current calendar time for the user account.

When identifying the graphical elements for presentation, the pattern predictor logic will take into consideration the frequently accessed graphical elements as well as graphical elements that are accessed less frequently, based on the usage pattern. For example, if the pattern predictor logic 214 identifies the electronic message application, news service, drive service, search service, social media application, calendar application, sites application, map application as some of the applications that are used at different times on each weekday and the bank application, mortgage calculator application, etc., on a monthly basis and investment portfolio application on a quarterly basis, then the pattern predictor logic will take this into consideration in identifying the appropriate graphical elements for presenting to the client device. It should be noted that the list of graphical elements mentioned above is a sample and should not be considered restrictive or representative of the options available for the user account. The graphical elements that are available for a user account are based on the content service provider, third party service providers and on the user's interest. For the above example, when the current calendar time of the request from a client device falls at 8:00 a.m., on a Monday, the first of a month at the beginning of a quarter, the pattern predictor logic 214 identifies the bank website, mortgage calculator application, and investment portfolio application in addition to the graphical elements—electronic message application, electronic calendar application, drive service that are accessed more frequently, for presenting to the client device based on the previously established access patterns for the user account. If the first of the month does not fall at the beginning of a quarter, then the investment portfolio application is not considered for presenting to the client device while the remaining graphical elements from the above example are considered.

The pattern predictor logic 214 initially determines all the graphical elements that need to be included based on the access patterns of the user for the calendar time of the request and then adjusts the list based on the context of the user account. The context of the user account may be based on the graphical element that is accessed when the user accesses his/her user account. For example, a user associated with the user account may access an interactive graphical element, for e.g., the electronic message (e.g., email) application. The user's access of the graphical element—message application, automatically triggers a request for presentation of graphical elements, to the optimization tool 201 executing on the server 200. The predictor logic within the optimization tool 201 will identify the context of the user account (e.g., message application) and use this information to identify the graphical elements that are relevant for the current calendar time for the user account. In this example, the predictor logic may automatically filter out the message application from the list of graphical elements identified for the current calendar time before presenting the list at the client device. The predictor logic thus addresses the redundancy issue of the conventional tools by eliminating the graphical element based on the context of the user account defined by the user's access of the graphical element in the user account, when the request is received.

In some implementations, the pattern predictor logic 214, in addition to analyzing the access patterns of the user, may determine the graphical elements based on the geo location of the client device at the time the request for presentation of the graphical elements is received. The geo location of the client device may be determined based on a geo location tracking tool, for e.g., global positioning system (GPS) tool available within the client device. The geo location of the client device may be different from the geo location defined in the user profile data of the user account due to the user traveling to or from work or on business/vacation, etc. It should be noted that such geo location tracking of the client device may only be enabled and used with explicit permission from a user of the client device. As such, the client device may be equipped with an option to enable/disable the device tracking tool. Based on the geo location of the client device, the pattern predictor logic may identify graphical elements that are appropriate for the geo location. For example, if the user is traveling on business or pleasure, the user may be interested in the map application, hotel/restaurant application, travel application, local events, etc., to assist the user during his/her trip. As a result, the pattern predictor logic 214 may identify one or more new graphical elements and present them with the other contextually and temporally relevant graphical elements identified for the user account. In some implementations, the new graphical elements identified for the user account may be presented in addition to the graphical elements identified based on the access patterns of the user. In some other implementations, the new graphical elements identified for the user account may be used to replace a graphical element identified for the user account. For example, if the pattern predictor logic 214 identifies a set number of graphical elements for the user account based on the access patterns of the user and one or more of the graphical elements in the identified set have not been interacted upon by the user in a recent past, then the pattern predictor logic 214 may replace these graphical elements with the one or more new graphical elements.

In some implementations, the predictor logic 214 may interact with the weighting function 222 to determine a weighting value for the different access patterns identified for the user account. The weighting value is used to determine relative ranking of the access patterns to enable the predictor logic 214 to identify the graphical elements for presentation for the user account. In some implementations, the pattern predictor 214 is configured to identify sub-patterns between the interactive graphical elements within the access patterns and assign a higher weighting value to those access patterns in which there is an increased repetition of the identified sub-patterns of the graphical elements. The increased repetition of the sub-patterns identifies the user's selection preference of the graphical elements and this selection preference is recognized by the predictor logic by the increased weighting value accorded to the access patterns that include the sub-patterns. In some embodiments, the sub-patterns may identify the usage correlation between the two or more graphical elements. The weighting value is used to increase or decrease the significance of the graphical elements within the access pattern that is presented for the user account. The weighting value is used in the ranking and ordering of the graphical elements for the user account.

In addition to analyzing the access patterns of the user associated with the user account, behavior patterns of other users associated with other user accounts are also analyzed and one or more graphical elements that are popular with the other users may be identified for inclusion in the presentation of the graphical elements for the user account. The social relevance logic 216 interacts with one or more social graphs in one or more social networks 223 to identify user accounts of other users that are either socially or demographically connected to the user associated with the user account from which the request was received. The social relevance logic 216 analyzes the access patterns of the other users associated with the users accounts to identify one or more new graphical elements that are popular with the other users. Selected ones of the new graphical elements may be included in the list of graphical elements provided for the user account, in response to the request. As described with the predictor logic 214, the social relevance logic 216 may interact with the weighting function 222 to provide a weighting value to the new graphical elements identified from the other user accounts. The list of graphical elements including the new graphical elements are adjusted based on the context of the user account so that the presentation of the graphical elements are contextually and temporally relevant to the user.

In addition to the pattern predictor logic 214 and social relevance logic 216, the interaction analyzer 208 includes a recommender logic 218 to identify one or more alternate graphical elements that are similar in function or service to a particular graphical element within the list of graphical elements identified for the user account that was identified by the pattern predictor logic 214 or the social relevance logic 216. For example, based on the access patterns of the user account or based on the geo location of the user at the time the request was received, it may be determined that the user may benefit from a particular traffic predictor application. The recommender logic may also determine that the user has accessed a particular traffic predictor application at least once before. The recommender logic may analyze the access patterns of other users, for example, to determine other traffic predictor applications that are more popular with other users. The recommended logic may interact with the history usage query 212 to obtain the access patterns of the other users for identifying the other traffic predictor applications that are popular with other users. In some implementations, the other users may be socially or demographically related to the user of the user account. The recommender logic may then identify and recommend at least one of the other traffic predictor applications as an alternate graphical element to the traffic predictor application, based on the weighting value assigned to the different traffic predictor applications. In some implementations, the recommender logic 218 may interact with the weighting function module 222 to assign a weighting value to each of the access patterns of other users in which the traffic predictor applications is included and use the weighting value to identify a particular traffic predictor application for recommending to the user of the user account. The weighting value may be assigned to the access patterns based on usage attributes of the one or more graphical elements identified within. Some of the usage attributes may include the frequency of use of a particular graphical element by the other users in the respective user accounts, the context in which the particular graphical element was accessed, the respective user's engagement time at the particular graphical element, etc. The alternate graphical elements identified by the recommender logic 218 may be provided alongside the corresponding graphical element or in place of the corresponding graphical element.

The graphical elements identified for the user account are organized using the application organizer 210 and presented for the user account. Upon presentation, user feedback, in the form of user interactions at the graphical elements, are tracked and the user interactions are stored in the history usage database. The user interaction at the graphical elements identify the access pattern followed by the user for the graphical elements presented for the user account. The user feedback evaluator module 220 evaluates the user feedback for the user account to determine the relevance of graphical elements presented for the user account. The evaluation may entail analyzing the access pattern maintained in the history usage database to identify the sequence of access as well as other usage characteristics/attributes (for e.g., engagement duration for each of the graphical elements, geo location of the client device, etc.). In some implementations, the access pattern is correlated to a computing configuration type of a client device of the user on which the access pattern was generated. The computing configuration type may include one or more of type of computing device platform used by the client device, type of operating system, type of browser, language setting type, etc., used to access the user account. The user feedback evaluator module 220 uses the usage characteristics for the user account from the different computing configuration types to evaluate the user feedback.

In addition to the feedback from the user account, the feedback from other users may also be used in the evaluation. As with the user account, the feedback from the other users correlated to the different computing configuration types are gathered and used in the evaluation. The user feedback evaluator 220 interacts with the weighting function module 222 to determine weighting values for the different access patterns identified in the feedback. The weighting values may be pre-defined for different access patterns. The weighting values associated with the different access patterns are used in rating and ranking the various graphical elements identified for presentation for the user account.

Information related to the graphical elements identified by the various module logics of the interaction analyzer 208 are provided to the application organizer 210. The application organizer uses a prediction process that combines past interactive data provided in the access patterns and applies the weighting values associated with the access patterns to increase or decrease the significance of the graphical elements to generate an ordered list, in response to the request. In some implementations, the application organizer 210 may organize the graphical elements in the list into one or more category types. In some implementations, the category types may be specified by users. In other implementations, the category types may be determined based on context of the graphical elements. The organized list of graphical elements is optimized so as to be contextually and temporally relevant for the user account. In some implementations, the organized list of graphical elements is optimized for the geo location so as to be geographically relevant for the user account, in addition to being contextually and temporally relevant. The application organizer 210 may also take into consideration any user customization provided for one or more graphical elements in the list so as to present a more personalized ordering of the graphical elements. For example, the user may have indicated that the electronic message application, when present in the list, should always be presented as the first application in the list. The organized list of graphical elements is returned to the client device for rendering at the display device, in response to the request. In some implementations, the application organizer 210 may specify the location on a user interface of the client device where the ordered list of interactive graphical elements are to be presented.

Figure 3A:
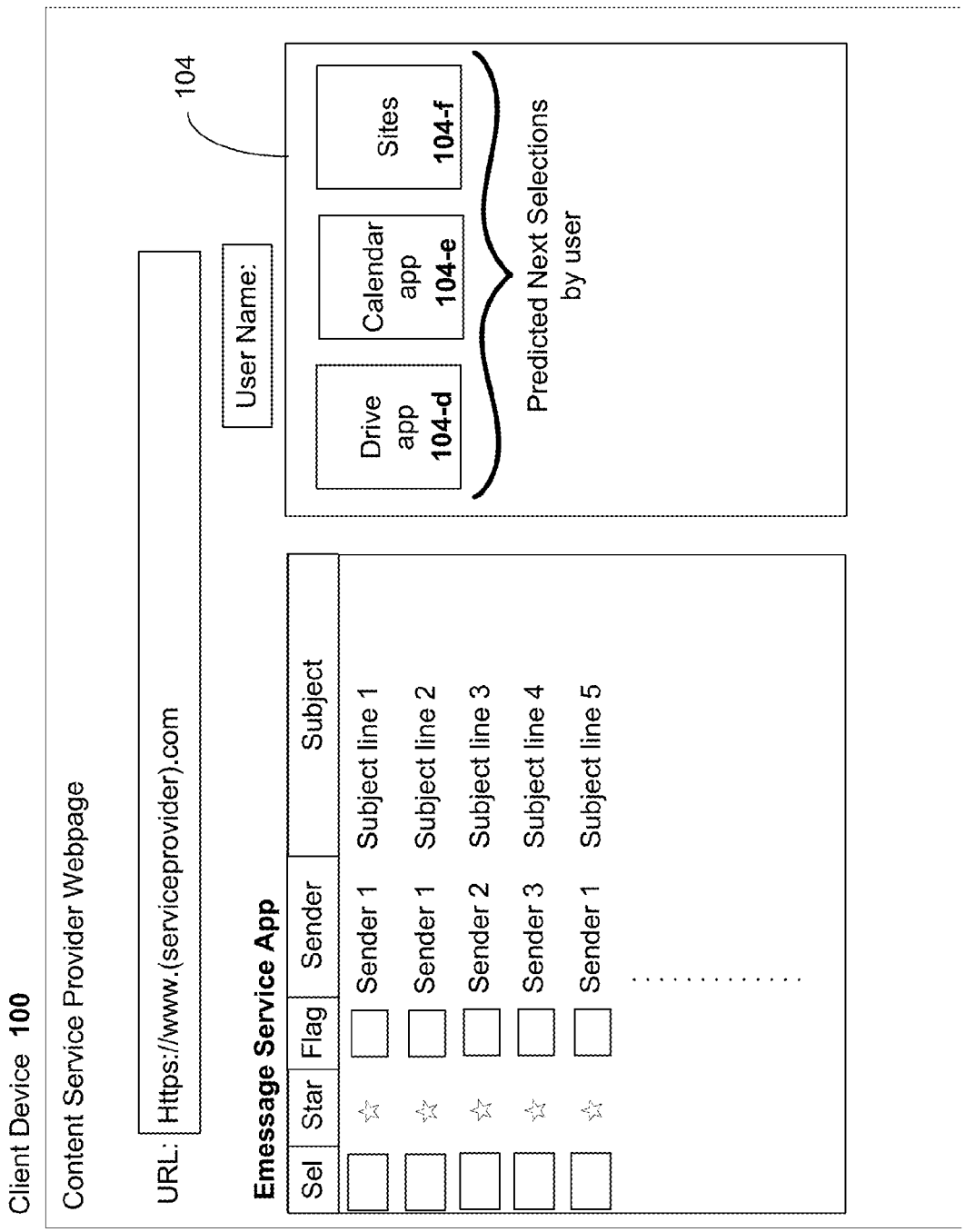
FIGS. 3A-3D illustrate a user interface rendering the contextually relevant interactive graphical elements based on graphical element selected when a user accesses the user account, in accordance with some implementations.
Figure 3B:
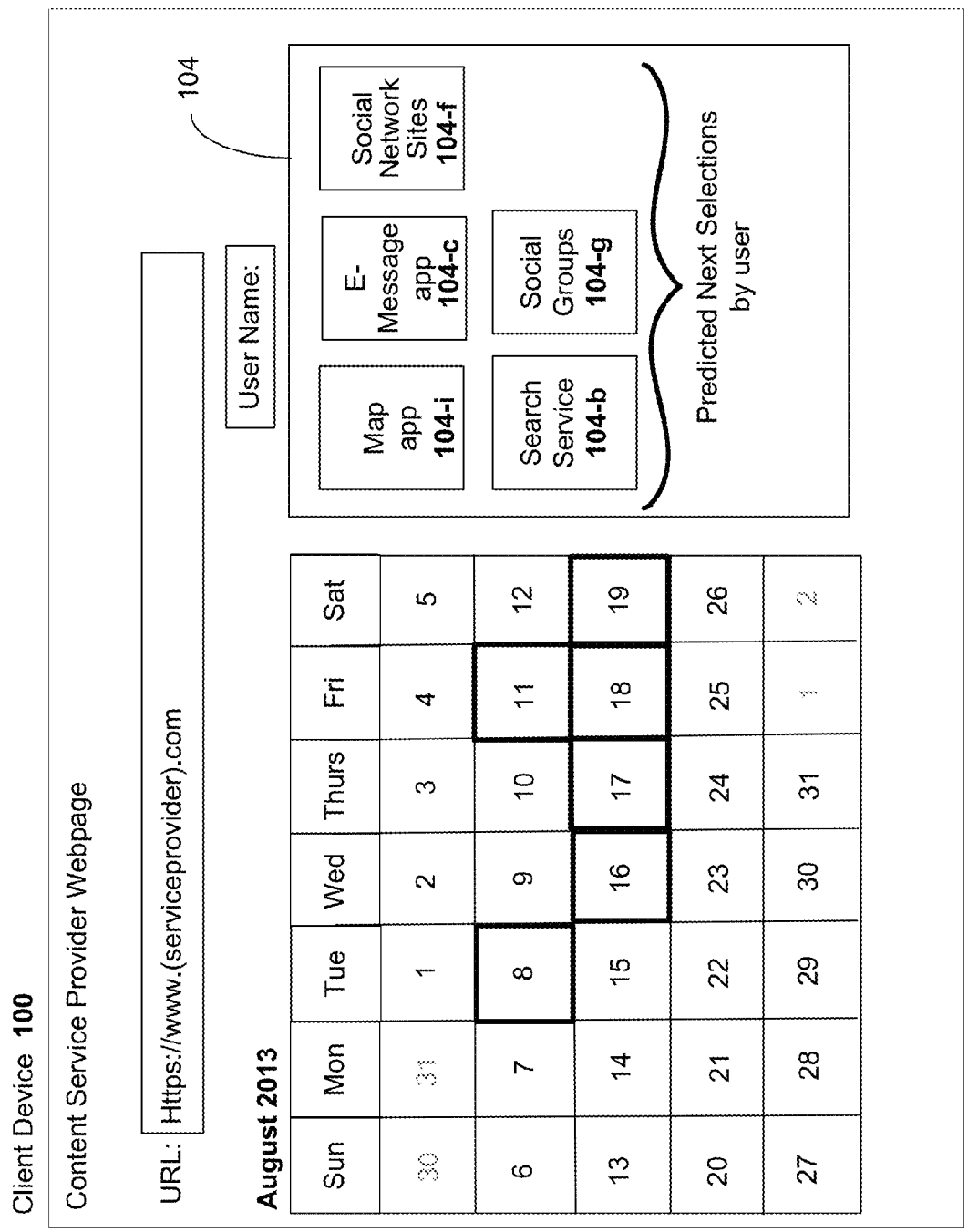
Figure 3C:
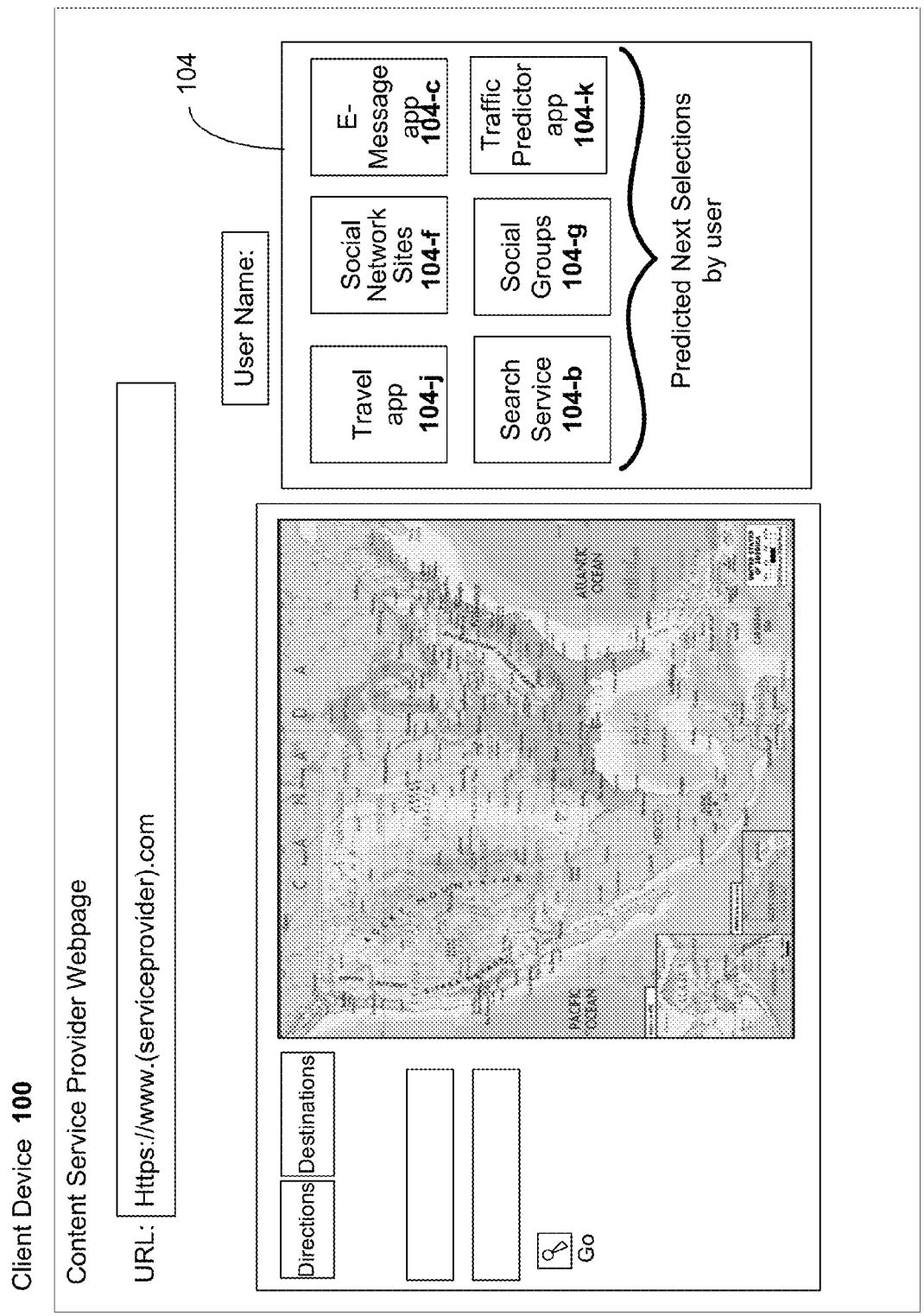

FIGS. 3A-3C illustrate sample screen rendition of a display device of the client device, in accordance to the various implementations. As shown in FIG. 3A, a user accesses an electronic message service 104-*c* at the user account. In response to the message access, a request is sent out to the server to provide a list of graphical elements for the user account for the current calendar time. In response, the optimization tool 201 identifies and generates an organized list of contextually and temporally relevant graphical elements for the user account for the current calendar time. The graphical elements are identified and organized based on intelligent prediction of the usage pattern for the user account based on the prior usage or access patterns available for the user account.

It should be noted that in various implementations, the graphical elements are provided in the user account in a toolbar 104 alongside the selected graphical element. The graphical elements presented for the user account are dynamic in nature, in that as and when the graphical elements accessed from the user account changes, the listing and order of the graphical elements also change to provide contextually and temporally relevant graphical elements. Thus, in the list of graphical elements presented in the tool bar for the user account, in response to the user selecting the message service application 104-c, the graphical elements may include the drive service 104-d, calendar application 104-e and the social network sites service 104-f in that order for the current calendar time. The ordered list of graphical elements does not include the message application 104-c, which is already rendered or other graphical elements that are not contextually or temporally relevant to the user at the current calendar time.

FIG. 3B illustrates an alternate implementation, wherein the graphical elements presented to the user for the user account, in response to the user accessing a calendar application 104-e for a calendar time, may include map application 104-i, message service 104-c, social network sites 104-f, search service 104-b and social groups application 104-g in that order based on the access pattern for the current calendar time.

FIG. 3C illustrates yet another implementation, wherein the graphical elements presented to the user for the user account for a current calendar time, are based on the context of the user account. In the example illustrated in FIG. 3C, the graphical elements identified, in response to the user accessing a map application for a current calendar time, include travel application 104-j, social network sites 104-f, message application 104-c, search service 104-b, and a social groups application 104-g, in that order. The travel application 104-j may include public transport information, hotel accommodations, local attractions, local event highlights for the calendar time, local restaurants, etc. The recommender logic 218 of FIG. 2, in addition to using the context of the selected graphical element, may also use the geo location characteristic of the client device, detect a change in the geo location of the client device provided by the location processor within the client device (when activated) to identify the new graphical element (for e.g., travel application) for presentation in the toolbar.

The application organizer 210 of FIG. 2 may rank the identified graphical elements in an order of relevance for the user account, based on the context, current calendar time and, sometimes, the geo location so that these graphical elements may be organized appropriately when presented in the toolbar 104 for the user account. For example, the application organizer 210 may rank the travel application high enough to enable the application organizer 210 to order the travel application as the first application to be presented in the toolbar for the user account. It should be noted herein that the application organizer 210 takes into account user customization of the graphical elements while ordering the graphical elements for the user account. When user customization is available for certain graphical elements, when present, the user customization will override the ranking order of the graphical elements for presentation in the toolbar.

In some implementations, the recommender logic 218 identifies additional graphical elements based on the context, geo location of the client device and current calendar time. For example, for the implementations illustrated in FIG. 3C, the recommender logic 218 may identify and include a traffic predictor application that is appropriate for the geo location identified by the device's location processor, for presentation in the toolbar. The traffic predictor application 104-k may have been selected by the user during his/her earlier travel to the geo location and the recommender logic 218 may detect such selection based on the geo location of the device and identify the new graphical element. The recommender logic 218, thus, identifies appropriate new graphical elements for the user account based on the context, time and/or geo location, irrespective of the frequency of access of the graphical elements.

Figure 3D:
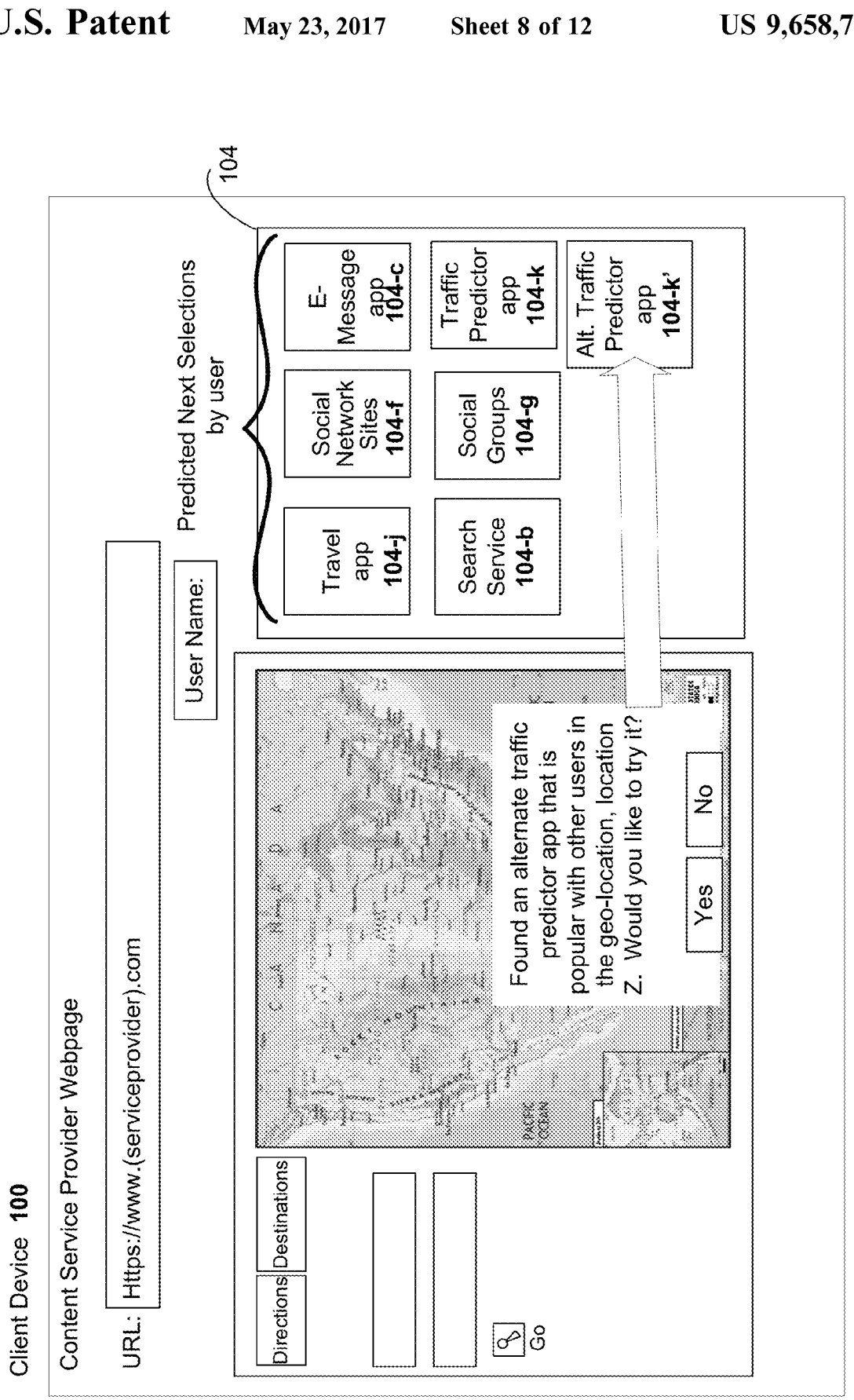

In addition to the graphical elements identified based on the user's access pattern and context of the selected graphical element, the interaction analyzer 208 may recommend one or more alternate graphical elements that are demographically or socially relevant for the user account, based on the context of the user account and based on the ranking of the alternate graphical elements. FIG. 3D illustrates one such implementation for one of the graphical elements presented in FIG. 3C. The interaction analyzer 208 may, in addition to identifying the new graphical element (for e.g., traffic predictor application), also identify an alternate graphical element based on the ranking of the alternate graphical element. In some implementations, the graphical element identified as an alternate graphical element is of higher ranking than the one used by the user. The ranking may be determined by analyzing the access patterns of other users that are socially or demographically related to the user or based on the context of the user account. The interaction analyzer 208 may include the alternate graphical element (for e.g., alternate traffic predictor application) along with the graphical element (for e.g., traffic predictor application) identified from the user's access pattern, in the list of graphical elements identified for presenting at the user account. In some implementations, the interaction analyzer 208 may present the alternate traffic predictor application with an informational message (e.g., "Found an alternate traffic predictor application that is popular with other users in the geo-location, Location Z. Would you like to try it?" with one or more options for user selection). In these implementations, based on the option selected by the user of the user account, the alternate traffic predictor application may be included in the toolbar or dynamically removed from the toolbar.

Figures 1, 3D:
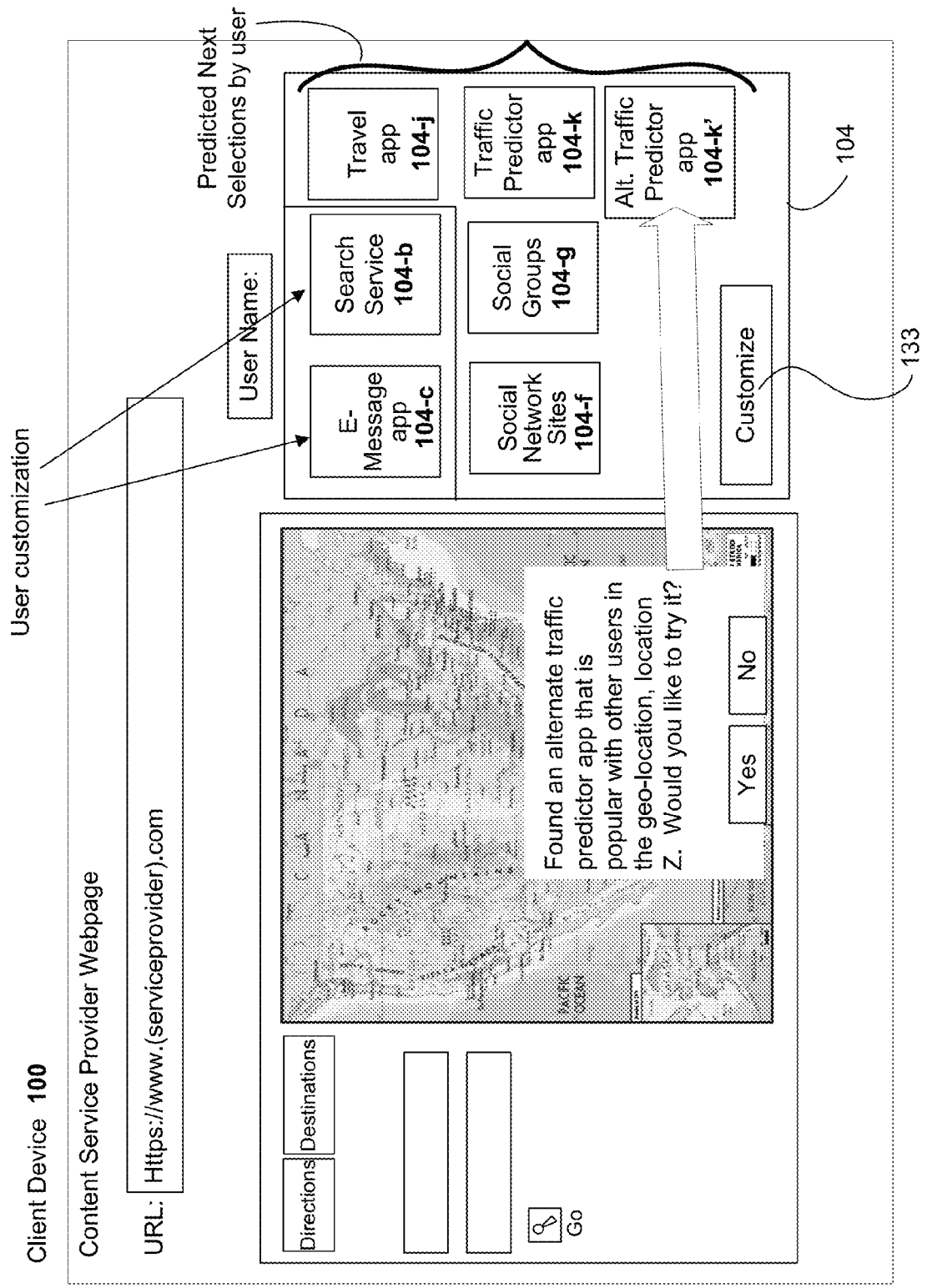

FIG. 3D-1 illustrates another implementation identifying one or more graphical elements whose rendering location within the toolbar has been set by the user, as part of the user customization. For example, the user may select the message application 104-c and search service application 104-b, when included in the list, to always be the first and the second graphical applications within the list that is to be presented for the user account. In this example, the remaining graphical elements defining the contextual and temporal relevance for the user account for the current calendar time, are presented in the toolbar in positions that follow the user customized graphical elements. When the message application or the search service application is not present in the list of graphical elements to be presented for the user account, the identified graphical elements may be presented in an order beginning from the first position on the toolbar. The user customization may not only specify the first position but may specify a last position or any other position in the toolbar where a certain graphical element has to be positioned, when present. To accommodate user customization, the application organizer module within the optimization tool may provide a customization option 133 at the toolbar for user selection during customization, as illustrated in FIG. 3D-1. The user customization is taken into account when organizing the list of graphical elements that are contextually, temporally and/or geographically relevant to the user of the user account.

Figure 4:
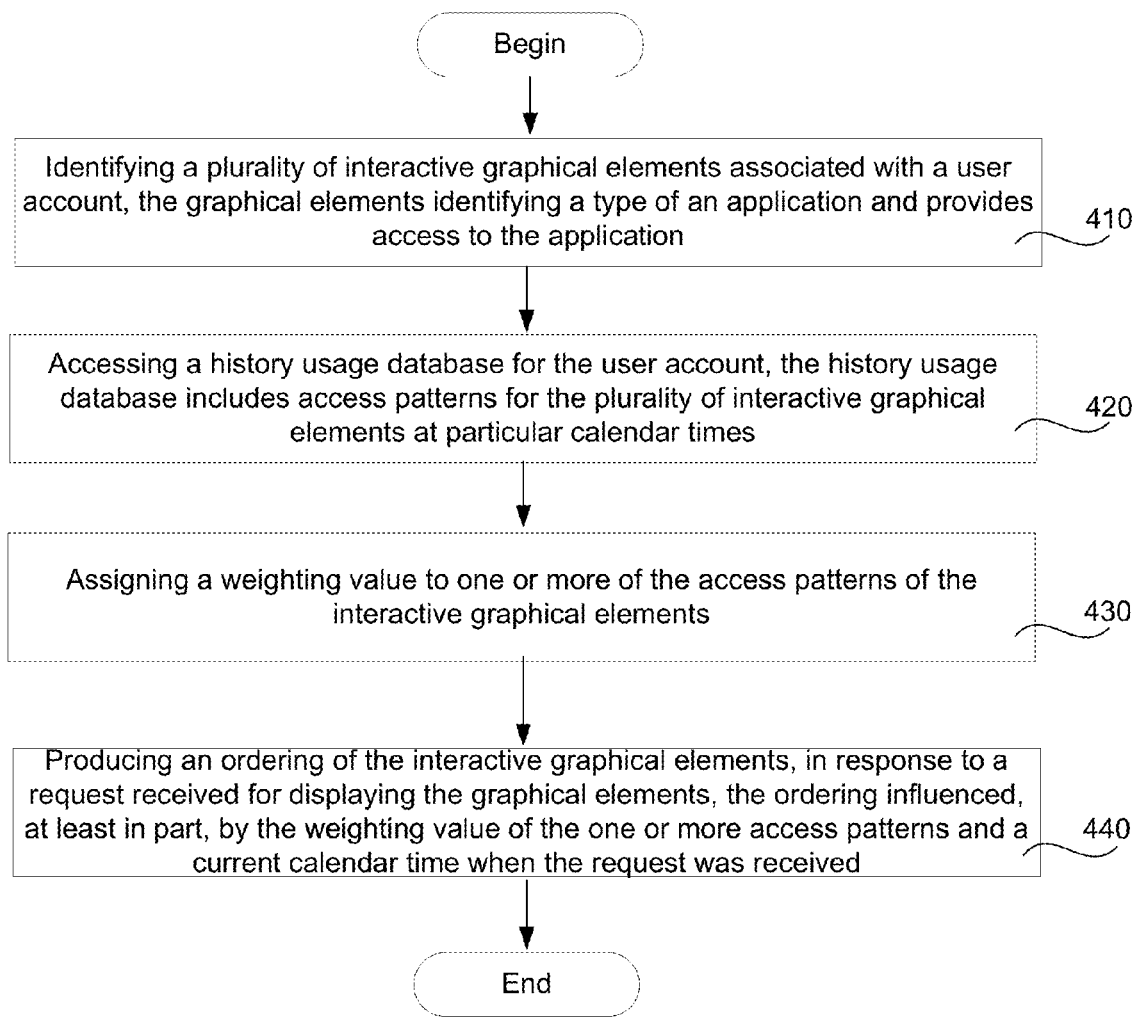
FIG. 4 illustrates method operations for presenting an ordering of interactive graphical elements for a user account, in accordance with some implementations.

FIG. 4 illustrates method operations for optimizing presentation of graphical elements based on contextual relevance for the user account, in some implementations. The method begins by identifying a plurality of interactive graphical elements associated with a user account, as illustrated in operation 410. Each of the plurality of interactive graphical elements identify a type of an application, service or a website. The interactive graphical elements may be presented in the form of application icons with links to access the respective application, service or the website.

A history usage database for the user account is accessed, in response to the identification of the plurality of graphical elements, as illustrated in operation 420. The history usage database maintains the access patterns, at different calendar times, for the plurality of graphical elements available for each of the user accounts with each access pattern being associated with a particular calendar time. The access patterns identify the usage characteristics of each graphical element based on the interactions of the users in the respective user accounts. The usage characteristics defined in the access patterns may identify sequence of access, frequency of usage, engagement duration, geo location of the client device, contextual usage, etc., for each of the graphical elements at different calendar times. The contextual usage may be used to identify correlated graphical elements.

A weighting value is assigned to the one or more access patterns of the graphical elements defined by the user interactions in the user account, as illustrated in operation 430. Repeated access sub-patterns between particular graphical elements are identified within the access patterns and a greater weighting value is provided to those access patterns that contain the sub-patterns. In some implementations, the weighting value may take into account the contextual usage aspect between two or more graphical elements when weighting the access patterns. The weighting value is used to increase or decrease the significance for the graphical elements within the one or more access patterns and the weighting value of the access patterns are used to identify the graphical elements for the user account for the current calendar time.

An ordering of the identified graphical elements for the current calendar time, is performed for presentation at the user account, in response to a request received for display of the interactive graphical elements for the user account, as illustrated in operation 440. The ordering of the graphical elements is, at least in part, influenced by the weighting value of the one or more access patterns and the calendar time when the request is received. The graphical elements identified may include graphical elements provided by the content service provider and/or third party service providers. The graphical elements may also include one or more graphical elements provided as alternates or in addition to the one or more graphical elements identified for presenting for the user account and these graphical elements are contextually equivalent to the corresponding one or more graphical elements. The organized graphical elements are temporally and contextually relevant for the user account for the current calendar time and are presented in a toolbar for user interaction.

Figure 5:
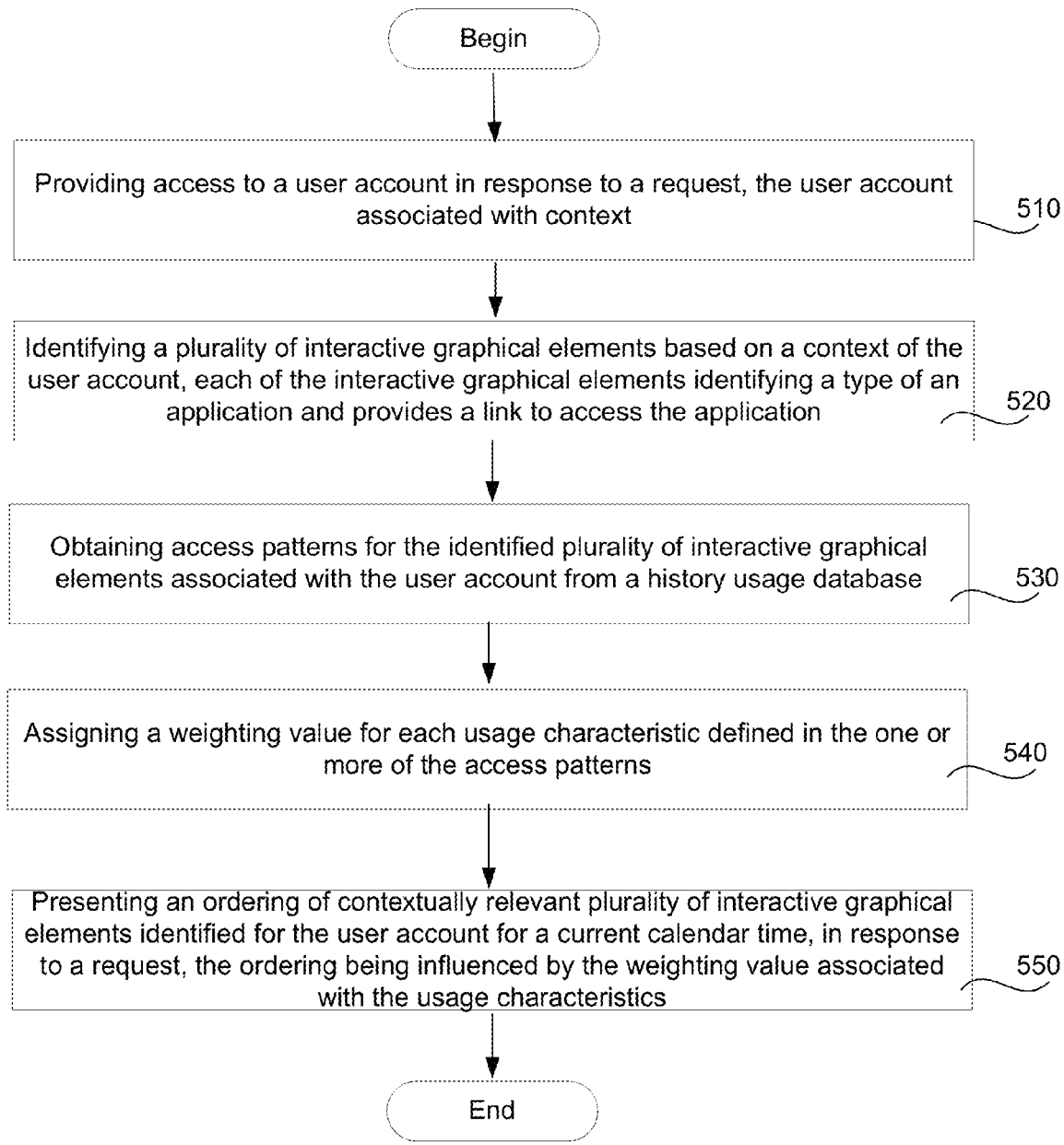
FIG. 5 illustrates method operations used for presenting an ordering of contextually relevant graphical elements for a user account, in accordance with some alternate implementations.

FIG. 5 illustrates a method for optimizing presentation of interactive graphical elements based on contextual relevance. The method begins with providing access to a user account in response to a request, as illustrated in operation 510. The access to the user account may be provided in response to a request from a user. The request may identify a graphical element and the context of the graphical element the user wishes to access. A plurality of interactive graphical elements are identified based on the context of the user account, as illustrated in operation 520. Each of the interactive graphical elements identify a type of an application and provides a link to access the application.

Access patterns for the identified graphical elements associated with the user account are obtained from a history usage database, as illustrated in operation 530. The history usage database is a repository that maintains access patterns for the plurality of interactive graphical elements at different calendar times for a plurality of user accounts. A weighting value is assigned to one or more access patterns of the interactive graphical elements, as illustrated in operation 540.

The plurality of interactive graphical elements identified for the current calendar time for the user account are ordered and presented, in response to the access request, as illustrated in operation 550. The ordering of the interactive graphical elements is influenced, at least in part, by the weighting value of the one or more access patterns, the current calendar time and any user customization defined for the one or more of the interactive graphical elements. The organized interactive graphical elements are contextually and temporally relevant for the user account for the current calendar time.

The various implementations described above provide users with applications, services and/or website links that are relevant for the user account for a given calendar time. An optimization tool analyzes past access patterns for the interactive graphical elements available for the user account, intelligently predicts the access pattern for the user account for the current calendar time and identifies only those graphical elements that are contextually useful, relevant and appropriate for the user for the current calendar time. Weighting values defined for the one or more of the access patterns at different calendar times are used to identify and order specific ones of the interactive graphical elements in an organized list for the current calendar time. The selection and ordering of the graphical elements are adjusted based on the calendar time of the receipt of the request, making this a more scalable solution. The ordered graphical elements are presented for the user account. Upon presenting, usage feedback is gathered for the presented graphical elements and used to either reinforce the ordering or to refine the ordering to generate an access pattern for the particular calendar time so that future renditions of the graphical elements for the calendar times may use the generated access pattern that are contextually and temporally relevant to the users. User customization is allowed in the ordering of the graphical elements so as to provide a more personalized ordering of the graphical elements.

It should be noted that the usage patterns of a user used to identify the interactive graphical elements, are obtained based on the user's consent to process usage data. The user may be provided with options and/or controls for allowing processing and/or use of such data in order to provide the user with a more customized set of contextually and temporally relevant graphical elements for the user account. Such options/controls may be provided on a single device or separately on individual devices used for accessing the user account. In the case where the user consent is available, the usage patterns of the consenting user are processed during a period of time and used in selecting and serving the appropriate graphical elements in a customized tool bar for the user account. The graphical elements presented in the tool bar are most relevant for the current calendar time as evidenced by the usage of the graphical elements over a period of time. The various implementations described throughout this application may therefore enable or disable collection of usage data based on consent or dissent from users.

Figure 6:
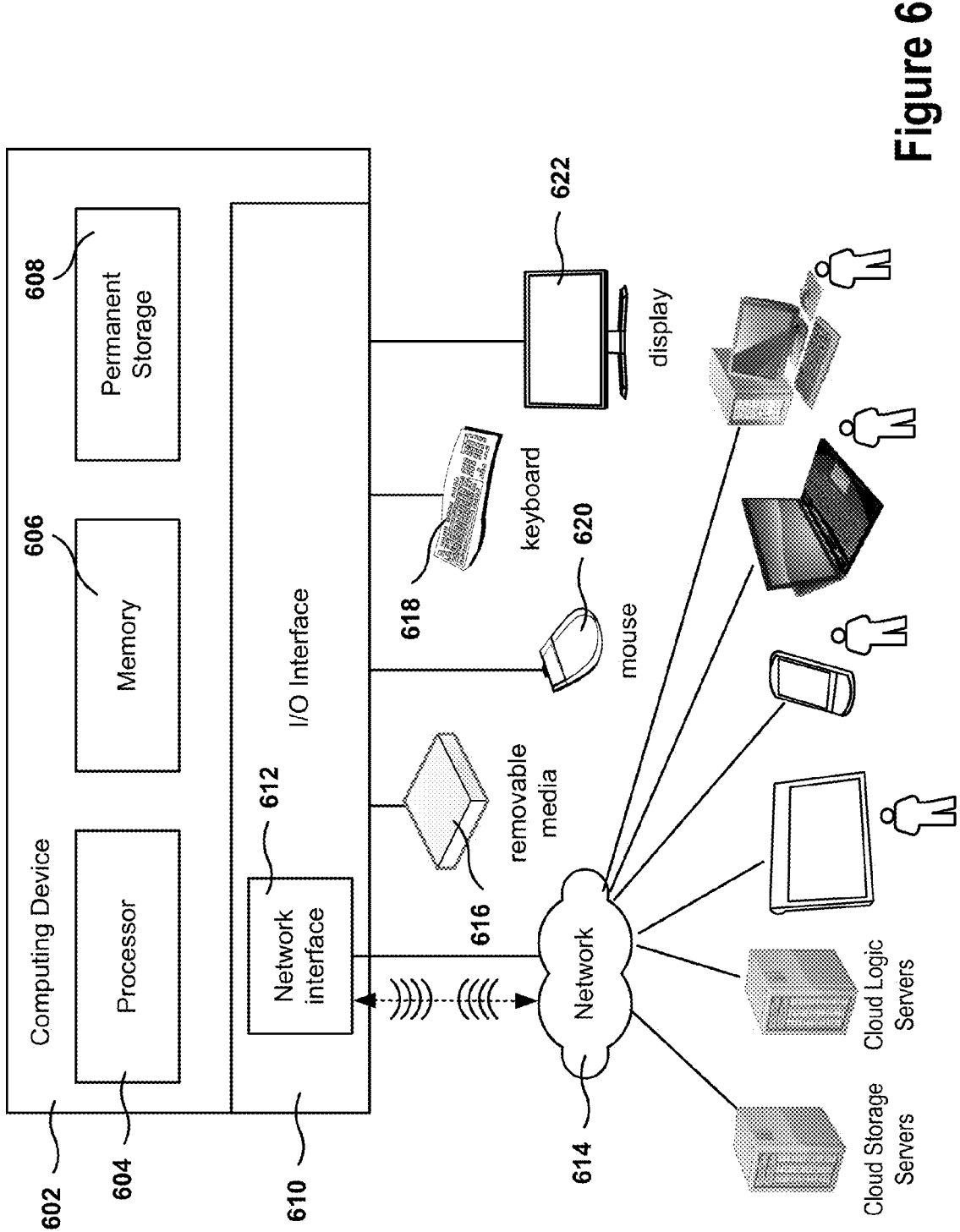
FIG. 6 illustrates a basic infrastructure of a computing device used in processing data obtained from a plurality of users in a social network, in accordance with some implementations.

FIG. 6 is a simplified schematic diagram of a computer system for implementing the present disclosure. It should be appreciated that the methods described herein may be performed with a digital processing system, which in some implementations may be a general-purpose computer system. Special purpose computers, which are designed or programmed to perform only one function, may be used in the alternative. The computing device 602 includes a processor 604, which is coupled through a bus to memory 606, permanent storage 608, and Input/Output (I/O) interface 610.

Permanent storage 608 represents a persistent data storage device, e.g., a hard drive or a USB drive, which may be local or remote. Network interface 612 provides connections via network 614, allowing communications (wired or wireless) with other devices. It should be appreciated that processor 604 may be embodied in a general-purpose processor, a special purpose processor, or a specially programmed logic device. Input/Output (I/O) interface 610 provides communication with different peripherals and is connected with processor 604, memory 606, and permanent storage 608, through the bus. Sample peripherals include display 622, keyboard 618, mouse 620, removable media device 616, etc.

Display 622 is configured to display the user interfaces described herein. Keyboard 618, mouse 620, removable media device 616, and other peripherals are coupled to I/O interface 610 in order to exchange information with processor 604. It should be appreciated that data to and from external devices may be communicated through I/O interface 610. The various implementations can also be practiced in distributed computing environments where tasks are performed by remote processing devices that are linked through a wired or a wireless network.

The various implementations can be fabricated as computer readable code on a non-transitory computer readable storage medium. The non-transitory computer readable storage medium holds data which can be read by a computer system. Examples of the non-transitory computer readable storage medium include permanent storage 608, network attached storage (NAS), read-only memory or random-access memory in memory module 606, Compact Discs (CD), flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Various implementations presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 614. Network 614 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware implementations, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing implementations have been described with a certain level of detail for purposes of clarity, it is noted that certain changes and modifications can be practiced within the scope of the appended claims. Accordingly, the provided implementations are to be considered illustrative and not restrictive, not limited by the details presented herein, and may be modified within the scope and equivalents of the appended claims.

What is claimed is:

1. A method, comprising,
    identifying a plurality of interactive graphical elements that are associated with a user account of a user, each interactive graphical element identifies a type of an application and is selectable by the user to provide access to the respective application;
    accessing a history usage database for the user account, the history usage database including access patterns of the user, an access pattern defining a selection sequence followed by the user for the interactive graphical elements at a particular calendar time within the user account;

assigning a weighting value to one or more of the access patterns of the user regarding the plurality of interactive graphical elements; and receiving a request to display the interactive graphical elements for the user account, the request acting to produce an ordering of the interactive graphical elements, the ordering, at least in part, being influenced based on the weighting value of the one or more access patterns of the user regarding the plurality of interactive elements and a current calendar time at which the request is received.

2. The method of claim 1, wherein the interactive graphical elements are rendered as application icons.

3. The method of claim 1, wherein the history usage database is a repository maintaining a plurality of access patterns of a plurality of users for a plurality of user accounts.

4. The method of claim 1, wherein the history usage database is a repository maintaining the access patterns for the user account of the user, each access pattern being associated with a particular calendar time.

5. The method of claim 1, wherein each access pattern of the user is correlated to a computing configuration type of a device of the user on which the access pattern was produced.

6. The method of claim 5, wherein the computing configuration type includes one or more of type of computing device platform, type of operating system, type of browser, language setting type, or any combinations thereof.

7. The method of claim 1, wherein the access pattern of the user identifies usage correlation between two or more interactive graphical elements.

8. The method of claim 1, wherein increased repeated access sub-patterns of the user between particular interactive graphical elements within the access patterns of the user produces an increase to the weighting value for the access patterns of the user that include the access sub-patterns of the user.

9. The method of claim 1, wherein the ordering uses a prediction process, the prediction process combines past interactive data provided in the access patterns of the user within the history usage database and applies weighting values associated with the access patterns of the user to increase or decrease significance for the interactive graphical elements provided in response to the request.

10. The method of claim 1, wherein the ordering defines a location on a display portion of a device that originated the request.

11. The method of claim 1, wherein the ordering includes organizing the interactive graphical elements under user specified or context specific category types.

12. The method of claim 1, wherein the ordering includes user customization, the customization includes defining an ordering position for a select graphical element, when present, for the user account.

13. The method of claim 1, further includes,
receiving feedback on usage of the interactive graphical elements provided in the ordering, the feedback acting to reinforce or refine weighting values assigned to the respective access patterns of the user, the reinforcement or refinement of the weighting values influencing ordering of the interactive graphical elements provided for the user account.

14. The method of claim 13, wherein the feedback identifies one or more new interactive graphical elements for inclusion in the ordering provided for the user account.

15. The method of claim 14, wherein the one or more new interactive graphical elements are identified for a particular category,
wherein the ordering adjusted to include the new interactive graphical element within the particular category for the user account.

16. The method of claim 14, wherein the one or more of the new interactive graphical elements are identified to replace the interactive graphical element within the ordering for the user account.

17. A method, comprising:
providing access to a user account of a user in response to a request, the user account associated with context;
identifying a plurality of interactive graphical elements for a current calendar time, based on the context of the user account, each interactive graphical element identifies a type of an application and is selectable by the user to provide a link to access the application;
identifying access patterns of the user regarding the identified plurality of interactive graphical elements associated with the user account, from a history usage database, the history usage database maintaining access patterns of the user, an access pattern defining a selection sequence followed by the user for the interactive graphical elements at a particular calendar time within the user account;
assigning a weighting value to one or more of the access patterns of the user regarding the interactive graphical elements; and
presenting an ordering of the plurality of interactive graphical elements identified for the user account for a current calendar time, in response to the request, the ordering being influenced by the weighting value of the one or more access patterns of the user, the current calendar time and any user customization defined for the one or more of the interactive graphical elements.

18. The method of claim 17, wherein increased repeated access sub-patterns of the user between particular interactive graphical elements within the access patterns of the user produces an increase to the weighting value for the access patterns of the user that include the access sub-patterns of the user, the weighting value influencing the ordering of the graphical elements for the user account for the current calendar time.

19. A non-transitory computer readable medium having programming instructions, which when executed by a processor, cause the processor to:
identify a plurality of interactive graphical elements that are associated with a user account of a user, each interactive graphical element identifies a type of an application is selectable by the user to provide access to the respective application;
access a history usage database for the user account, the history usage database including access patterns of the user, an access pattern defining a selection sequence followed by the user for the interactive graphical elements at a particular calendar time within the user account;
assign a weighting value to one or more of the access patterns of the user regarding the interactive graphical elements; and
receive a request to display the interactive graphical elements for the user account, the request acting to produce an ordering of the interactive graphical elements, the ordering at least in part being influenced based on the weighting value of the one or more access patterns of the user regarding the plurality of interactive elements and a current calendar time at which the request is received.

* * * * *